J. REPKING
SPRING.
APPLICATION FILED JULY 16, 1918.
1,323,491.
Patented Dec. 2, 1919.
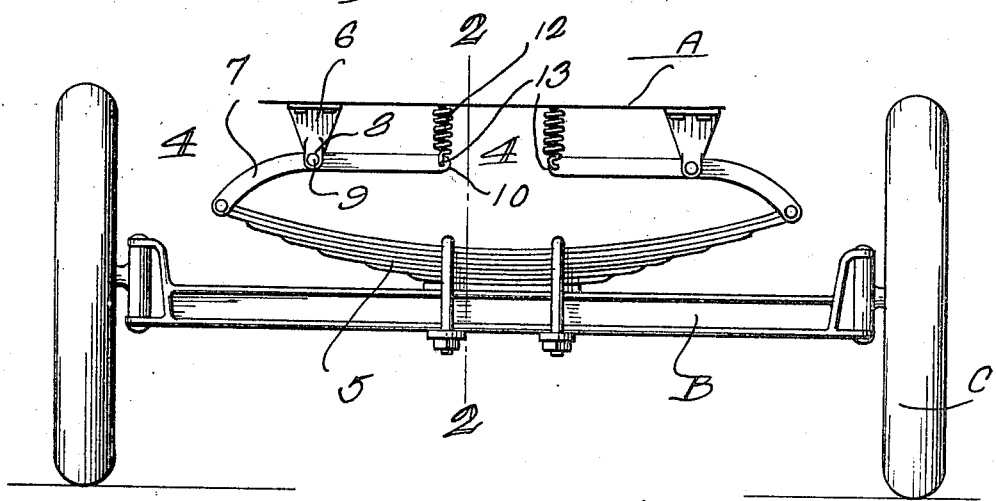
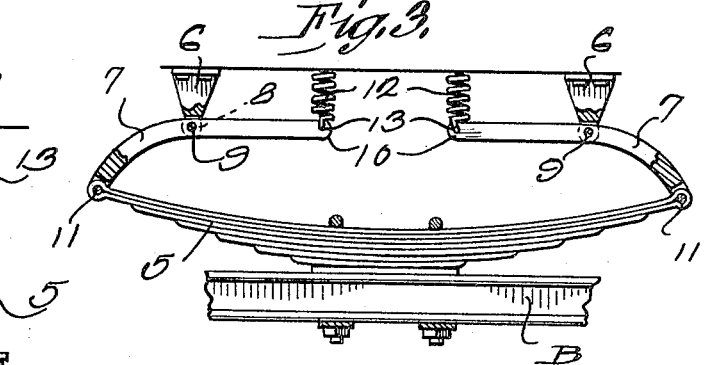
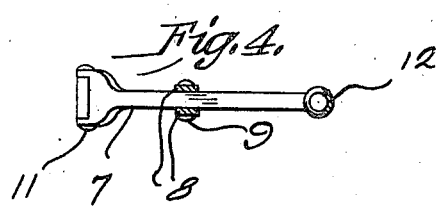
Inventor
J. Repking,
By Thomas Thomas
Attorneys
Witness
R. W. Hoagland
J. O. Parker

UNITED STATES PATENT OFFICE.

JOSEPH REPKING, OF EFFINGHAM, ILLINOIS.

SPRING.

1,323,491.

Specification of Letters Patent.

Patented Dec. 2, 1919.

Application filed July 16, 1918. Serial No. 245,153.

*To all whom it may concern:*

Be it known that I, JOSEPH REPKING, a citizen of the United States, residing at Effingham, in the county of Effingham, State of Illinois, have invented certain new and useful Improvements in Springs; and I do hereby declare the following to be a full, clear, and exact description of the invention, such as will enable others skilled in the art to which it appertains to make and use the same.

The invention relates to vehicle springs, and more particularly to the class of shock absorbers for buggies, carriages or other vehicles.

The primary object of the invention is the provision of a device of this character, wherein the construction thereof permits it to be interposed between relatively movable parts as for example, the running gear and the body of the vehicle so that the shocks and jars will be absorbed thereby when the vehicle is in motion thus relieving the occupants of undue shocks, jars or jolts and at the same time, increasing the life of the vehicle.

Another object of the invention is, the provision of a shock absorber of this character which coöperates with the springs of a vehicle so as to cushion resulting vibration imparted from the axle to the body of the vehicle to relieve the same, yet permitting the requisite flexing of both the axle and the body of the vehicle in the use thereof to assure easy riding.

A further object of the invention is the provision of a shock absorber of this character, which is simple in construction, readily and easily applied to the springs of a vehicle and to the body thereof, reliable and effective in operation, strong, durable and inexpensive to manufacture and install.

With these and other objects in view, the invention consists in the features of construction, combination and arrangements of parts as will be hereinafter fully described, illustrated in the accompanying drawing and pointed out in the claim hereunto appended.

In the accompanying drawing:

Figure 1 is an elevation of a vehicle showing the shock absorber constructed in accordance with the invention.

Fig. 2 is a sectional view on the line 2—2 of Fig. 1.

Fig. 3 is a fragmentary vertical longitudinal sectional view through the shock absorber, and Fig. 4 is a sectional view approximately on the line 4—4 of Fig. 1, looking in the direction of the arrow.

Similar reference characters indicate corresponding parts throughout the several views in the drawing.

Referring to the drawing in detail, A, designates generally the body of a vehicle and B, the axle at the ends of which are the ground wheels C, these parts being of the ordinary well known construction. Clipped or otherwise fastened to the axle B medially thereof is a spring 5 of the well known semi-elliptic form bearing at its medial portion upon the axle B.

Arranged between the spring 5 and the bed of the body A of the vehicle is the shock absorber which comprises a pair of brackets 6 which are bolted or otherwise fastened to the cross sill of the body near the ends of said sill, and swingingly connected to the brackets 6 are upwardly curved rocking arms 7, each bracket 6 being formed with a bearing 8 for receiving a pivot 9 swingingly connecting the swinging arm 7 thereto, the pivot 8 being located remote from the inner end of the arm 7 which is formed with an eye terminal 10, while the outer end of said arm 7 is hinged through the medium of a pivot 11 to the outer adjacent end of the spring 5 of the vehicle.

Detachably connected to the cross sill of the bed of the body A of the vehicle at an intermediate point are coiled retractile springs 12 which are arranged in upwardly convergent relation and have their opposite ends formed with hooks 13 for detachably engaging in the eye terminals 10 and in this manner the arms 7 are resiliently supported for rocking movement and on the travel of the vehicle all shocks or jars resulting therefrom are imparted through the axle B, to the arms 7, and are taken up and absorbed by the springs 12, the vehicle springs 5 being designed to cushion severe or excessive shocks and thereby relieving the strain of all shocks and jars from the vehicle body, and thus increasing the life of the same and at the same time assuring easy riding to the occupants of the vehicle.

In this manner both the minor or small vibrations and the usual jolts of the running gear are effectually cushioned so that the device provides a perfect shock absorber and prevents the transmission of shocks or jars to the body with the resultant longevity to the vehicle and comfort to the occupants thereof.

From the foregoing it is thought that the construction and manner of use of the device will be clearly understood and therefore a more extended explanation has been omitted.

What is claimed is:

The combination with a vehicle body including an axle, of a semi-elliptic spring disposed in vertical alinement with the axle and extending longitudinally thereof, spaced securing clips embracing the spring and axle at the center of the former, brackets depending from the body and provided with spaced ears, rocking arms having their intermediate portions fulcrumed between the ears of the brackets, the inner ends of the arms being provided with transverse openings and the outer ends thereof curved downwardly and enlarged laterally to form bifurcated portions receiving the adjacent ends of the spring and to which they are pivotally connected, and retractile springs secured at their upper ends to the vehicle body between the brackets and having their lower ends provided with loops extending through the openings in the inner ends of the rocking arms.

In testimony whereof, I affix my signature, in the presence of two witnesses.

JOSEPH REPKING.

Witnesses:
 BERNARD WEBER,
 JOHN McLAUS.